United States Patent [19]

Syed

[11] Patent Number: 4,829,813

[45] Date of Patent: May 16, 1989

[54] METHOD AND APPARATUS FOR NONINTRUSIVELY DETERMINING MACH NUMBER

[75] Inventor: Asif A. Syed, Loveland, Ohio

[73] Assignee: General Electric Company, Cincinnati, Ohio

[21] Appl. No.: 75,482

[22] Filed: Jul. 20, 1987

[51] Int. Cl.[4] .................. G01F 1/66; G01M 15/00
[52] U.S. Cl. .................................. 73/116; 73/861.18
[58] Field of Search ............... 73/861.18, 861.21, 115, 73/18.1, 589, 181, 178 R, 116, 117.4, 112

[56] References Cited

U.S. PATENT DOCUMENTS

| | | | |
|---|---|---|---|
| 3,021,708 | 2/1962 | November et al. | 73/194 |
| 3,039,305 | 6/1962 | Hall | 73/181 |
| 3,144,767 | 8/1964 | Testerman et al. | 73/194 |
| 3,717,038 | 2/1973 | Plett et al. | 73/398 AR |
| 3,748,502 | 7/1973 | Bernstein | 73/861.18 |
| 3,958,458 | 5/1976 | Foreman et al. | 73/194 B |
| 4,572,003 | 2/1986 | Fritz | 73/861.18 |
| 4,653,327 | 3/1987 | Vartersian et al. | 73/579 |

OTHER PUBLICATIONS

Fiske, Syed & Joshi, "Measurement of Acoustic Modes and Wall Impedance in a Turbofan Exhaust Duct." AIAA-83-0733 (4/83).
Kooi & Sarin, "An Experimental Study of the Acoustic Impedance of Helmholtz Arrays, Etc." AIAA-81-1998 (10/81).
Chung & Blaser, "Transfer Function Method of Measuring In-Duct Acoustic Properties," J. Acoust. Soc. AM. 68(3), 907-921, (Sep. 1980).
Bendat & Biersol, *Random Data: Analysis and Measurement Procedures,* John Wiley & Sons, New York, N.Y. 1971, pp. 8-29.

*Primary Examiner*—Donald O. Woodiel
*Attorney, Agent, or Firm*—Derek P. Lawrence; Nathan D. Herkamp

[57] ABSTRACT

The Mach number $M_o$ of flow in the intake nozzle or bypass duct of a gas turbine aircraft engine is determined from the acoustic impedance of a Helmholtz resonator to an engine fan-stator sound source. Pressure measurements $P_1(t)$ and $P_2(t)$, made nonintrusively at the duct wall surface and resonator cavity bottom are subjected to Fourier analysis to give $P_1(f)$ and $P_2(f)$, and acoustic impedance for the flow is determined from a complex transfer function $H_{12}$. Flow Mach number is then established using known acoustic impedance/Mach number correlation relationships or a stored look-up table. An alternative embodiment, utilizes a sound source mounted in the Helmholtz resonator bottom and determines Mach number by pressure measurements made at spaced locations on the resonator chamber wall.

22 Claims, 4 Drawing Sheets 4,829,813

METHOD AND APPARATUS FOR NONINTRUSIVELY DETERMINING MACH NUMBER

This invention relates generally to the determination of the rate of flow of fluids and, in particular, to a method and apparatus for the nonintrusive determination of the Mach number of fluids flowing through a duct.

BACKGROUND OF THE INVENTION

Determination of the rate of flow of fluids is especially important in aviation. Air speed and Mach number (the ratio of airspeed to the speed of sound at flight level) are useful not only for navigational purposes and flight control, but also for engine operation. Modern high performance aircraft, for example, use local measurements of the Mach number of gases flowing through engine ducts to control the setting of engine performance parameters.

Conventional determination of compressible flow Mach number is based on a known relationship between Mach number and measured fluid impact and static pressures. The static or nonmoving ambient pressure of the fluid can be measured directly by a pressure sensor sheltered from the velocity head, such as by a closed-ended tube having circumferential perforations at right angles to the flow. The impact pressure or differential pressure exerted due to the relative movement between the fluid and an object is generally derived from a measurement of total pressure, which is the sum of impact pressure and static pressure. Total pressure is typically measured using a pitot tube that has an open end which is pointed directly into the flow. An example of a system using pitot-static tube measurements to determine the Mach number of gases flowing through a duct of an aircraft engine is given in Plett et al U.S. Pat. No. 3,717,038.

A system has been proposed, as shown in Hall U.S. Pat. No. 3,039,305, for acoustically determining aircraft Mach number by means of an open-ended tuned tube with a sound source positioned at one end and with the other end open and facing upstream against the moving airstream. Sound wave emission out of the tube is suppressed by the airstream flow which acts as a barrier or acoustical impedance to reflect the sound waves back into the tube. The acoustical impedance increases with increasing speed of airflow and loads the sound source to decrease the average sound power radiated per cycle. Mach number can then be determined from previously derived relationship between the power emitted and the Mach number of the air stream flowing into the tube.

Both the conventional pitot-static tube and the suggested Hall patent tube arrangements require facing a tube into the fluid flow. The tubes are thus exposed to clogging or breakage due to ice particles or other debris which can interfere with their proper functioning, or render them totally useless. Futhermore, the intrusive nature of such devices limits their possibilites for placement in confined regions of ducts, such as aircraft engine ducts.

Considerable research has been conducted into the acoustic impedance effects of resonating cavities to sound generated in fluid flows as a means to achieve aircraft noise reduction, and in particular the reduction of noise generated in the ducts of gas turbine engines. Examples of such research are described in Kooi and Sarin, "An Experimental Study of the Acoustic Impedance of Helmholtz Resonator Arrays Under a Turbulent Boundary Layer," AIAA 7th Aeroacoustics Conference, Palo Alto, CA, Oct. 5-7, 1981, Paper No. 81-1998; and in Fiske, Syed and Joshi, "Measurement of Acoustic Modes and Wall Impedance in a Turbofan Exhaust Duct," AIAA 8th Aeroacoustics Conference, Atlanta, GA, Apr. 11-13, 1983, Paper No. 83-0733.

In aircraft gas turbine engines, noise reduction devices in the form of Helmholtz resonator arrays have been placed on duct walls with resonator parameters designed to absorb acoustic energy at selected frequencies, thereby providing quieter engines. Predicted acoustic impedances of such resonators at various engine noise frequencies have been compared against measured impedances at various known Mach numbers. The developed relationships have not, prior to this invention, been applied for determining flow Mach number for measured acoustic effects.

SUMMARY OF THE INVENTION

It is an object of the present invention to overcome the above and other drawbacks of the prior art, by providing a method and apparatus for nonintrusively determining the Mach number of a flow of fluid in a duct.

In one aspect of the invention, a method and apparatus are provided for determining the Mach number of an in-duct flow based on the nonintrusive determination of the acoustic impedance of a resonator cavity located within the duct wall.

A preferred embodiment of the invention, described in greater detail below, utilizes known relationships of acoustic impedance of resonators and Mach number to determine Mach number based on the determination of acoustic impedance of the resonator from pressure measurements made nonintrusively at the duct wall surface and in the chamber of a Helmholtz resonator which has an orifice opening into the duct wall surface. Pressure measurements made at the bottom of the resonator cavity are analyzed with those made at the wall surface at frequencies corresponding to the modes of sound generated in the duct, as by the sound produced through interaction of fan rotor blades and stators in the bypass duct of an aircraft high bypass gas turbine engine. An alternative embodiment utilizes a separate sound source located within the resonating chamber and determines acoustic impedance by means of pressure measurements made only in the chamber.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF THE PREFERRED EMBODIMENTS

Figure 1:
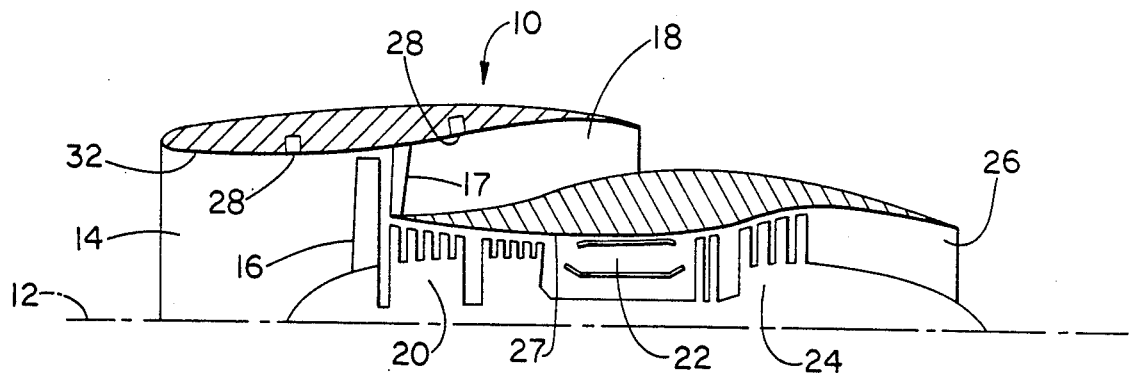
FIG. 1 is a simplified schematic side elevation view, in partial section, of a gas turbine engine with which the present invention may be used.

Embodiments of the invention are considered in connection with their use in the environment of an exemplary gas turbine engine 10, shown in FIG. 1.

The engine 10 is a high bypass turbofan engine arranged substantially concentrically about a longitudinal axis, depicted by a dashed line 12. The engine 10 includes air intake nozzle or duct 14, fan rotor blades 16, fan stators 17, a fan or bypass duct 18, compressors 20, a combustion chamber 22, turbines 24 and a propulsion nozzle or duct 26. Airflow from the intake nozzle 14 is split between a flow through a main engine duct 27 and flow through the bypass duct 18. For engine control purposes, the Mach number of the airflow in an engine duct, such as in the intake 14 or the bypass 18, is determined by means of a nonintrusive Mach detector 28 in accordance with the method and apparatus of the present invention.

Figure 2:
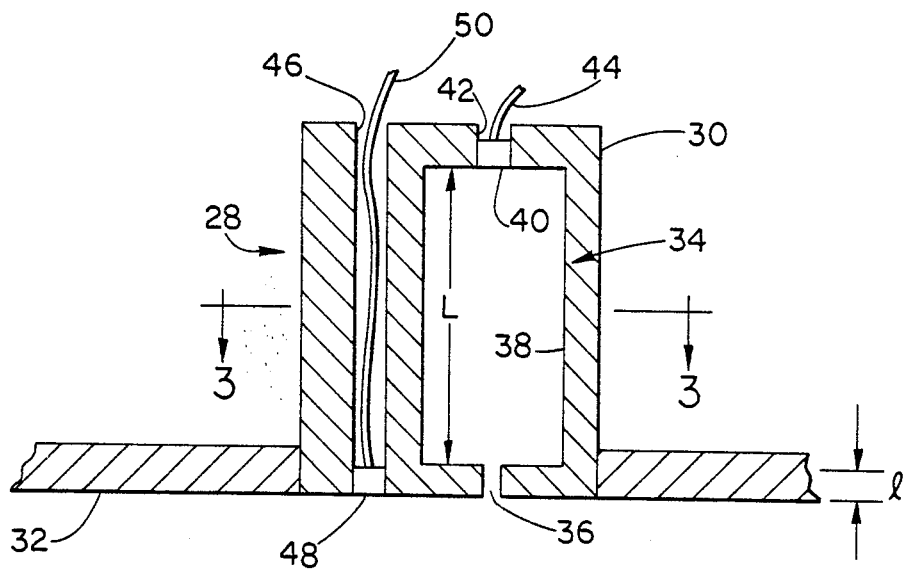
FIG. 2 is an enlarged partial schematic view of a duct section of the engine of FIG. 1, incorporating one embodiment of Mach detector in accordance with the present invention.
Figure 3:
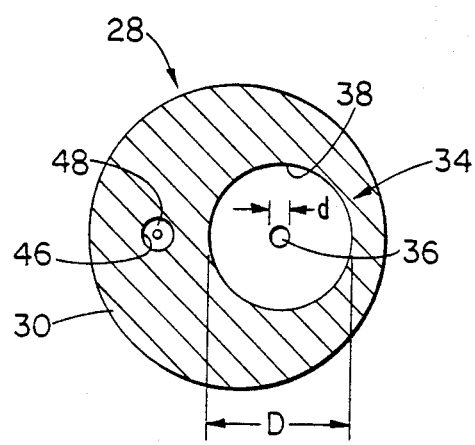
FIG. 3 is a section view, taken along the line 3-3 of FIG. 2.

The Mach detector 28, see FIGS. 2 and 3, has a housing 30 mounted flush with the wall 32 of the intake nozzle 14 or bypass duct 18 (see FIG. 1). An acoustical resonating cavity in the form of a Helmholtz resonator 34 is formed within the housing 30. The resonator 34 includes a tubular orifice 36 of length l and diameter d, positioned axially perpendicular to the immediately adjacent surface of wall 32 and leading to a cylindrical resonance chamber 38 of length L and diameter D. The dimensions l and d of the orifice tube 36 and the dimensions L and D of the resonance chamber 38 are chosen in accordance with well known principles to achieve a Helmholtz resonator 34 of a characteristic acoustical resonance frequency $f_o$, as further described below.

The Helmholtz resonator 34 functions according to well known principles to produce acoustical resonance at the characterstic frequency $f_o$ within the chamber 38 in response to the flow of air along the wall 32 past the opening of the orifice tube 36. The orifice 36 and chamber 38 of Helmholtz resonator 34 can be considered to be the acoustical analog of a mechanical damped mass-spring system, with the air in the small orifice 36 moving as a unit or sound particle, thereby behaving as an acoustic mass. The effect is similar to the resonance production of a tone when air is blown across the mouth of a wine jug or flute. Standing waves are set up by acoustical reflections between the top and bottom surfaces of the chamber 38.

The embodiment of resonator 34 shown in FIGS. 2 and 3 is chosen to provide a reasonable acoustic signal from which to measure the acoustic impedance effect of the orifice 36 to a sound, such as the characteristic sound produced as fan blades 16 rotate past stators 17. The dimensions of resonator 34 are therefore chosen so that the resonance frequency $f_o$ of the fundamental axial mode of resonator 34 corresponds to the fundamental frequency $f_f$ of the fan-stator sound source. Because the fan will rotate at different speeds of rotation and thus have different characterstic fundamental frequencies $f_f$, resonator frequency $f_o$ should be chosen so that the resonator 34 will resonate over a good portion of the band of fan frequencies $f_f$ expected to be encountered for the measurements of interest. It is desirable to design the resonator 34 so that sound particle velocity will be optimized to achieve good plane wave propagation in the axial mode, with little or no radial or circumferential mode wave propagation.

The dimensions of the orifice 36 are chosen to produce acoustic resistance to the sound particle velocity so that a reasonably good, measurable amount of damping is experienced. Typical suitable dimensions will be on the order of 40–50 mils for d and 32–50 mils for l. The size of the resonance chamber 38 should be chosen so that the major contribution to damping will be caused by the orifice 36 and the contribution caused by viscous losses in the chamber 38 will not be significant. Length L should be chosen about 3 to 4 times greater than diameter D; with typical suitable dimensions for L being about 1–1½ inches and those for D being about ¼–5/16 inches. Thus, for a fan-stator sound source characteristic frequency $f_f$ of around 1600Hz, dimension L will suitably be on the order of 1 inch (assuming a speed of sound at sea level of 1100 ft. per sec.)

A pressure sensor, such as a miniature transducer 40, is mounted within a bore 42 in centered position at the inner end or bottom of chamber 38, with its sensing surface flush with the chamber bottom wall. Care must be taken to seal the gaps between the transducer 40 and the bottom wall to avoid interference with the resonance effect. An electrical connector 44 serves to deliver electrical output from the transducer 40 to signal processing apparatus discussed below with reference to FIG. 4.

The housing 30 is also formed with another bore 46 for placement of a second pressure sensor, such as a second miniature transducer 48, along the wall 32 at a position spaced from the orifice 36. The sensing surface of the transducer 48 is mounted flush with the surface of wall 32, with gaps appropriately sealed to avoid interference with the passing airflow. As with the first transducer 40, an electrical connector 50 serves to transmit electrical output from the transducer 48 to the signal processing apparatus discussed below.

The transducers 40, 48 are chosen based on reasonable compromise among the desirable goals of good sensitivity, small dimension, rugged construction, and low cost. Transducers of 60–90 mil diameter are adequate. Kulite CQ-080-25D, Endevco 8514-10 and other transducers with similar characteristics are suitable candidates.

Transducer 40 senses the acoustic cavity bottom pressure $P_1(t)$ of stationary acoustic plane waves set up in the resonator 34 in response to a sound particle incident at the orifice 36 that corresponds to the component normal to wall 32 at orifice 36 of an acoustic wave generated by the fan-stator sound source. Transducer 48 senses the surface pressure $P_2(t)$ asserted by the component of the fan-stator sound source wave at the location in the duct of transducer 48. The outputs $P_1(t)$ and $P_2(t)$ of the transducers 40 and 48 are delivered by the connectors 44 and 50 to signal processing circuitry 52, shown in FIG. 4, for mathematical decomposition and determination of the acoustic impedance according to conventional analysis techniques. See, for example, J. Y. Chung and D. A. Blaser, "Transfer Function Method of Measuring In-Duct Acoustic Properties," J. Acoust. Soc. Am. 68(3), 907–921 (Sep. 1980).

Figure 4:
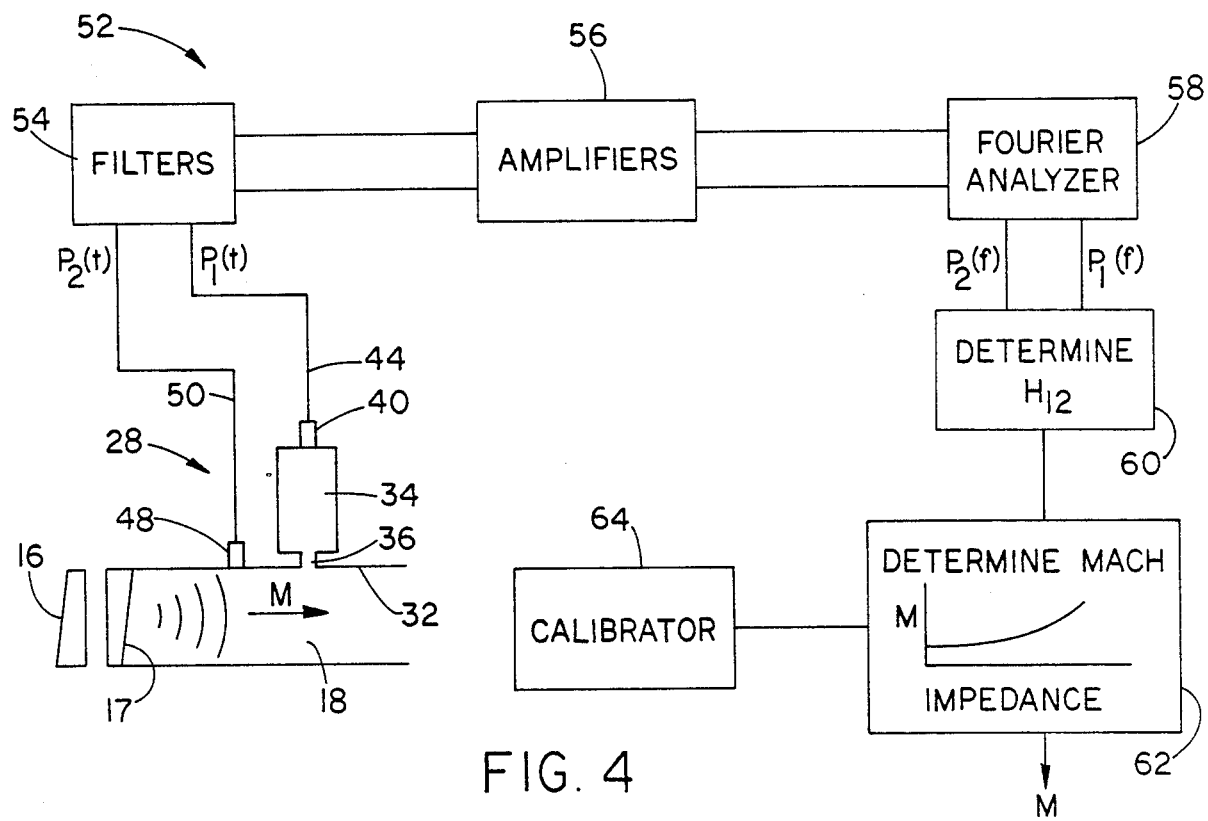
FIG. 4 is a block diagram of the signal processing circuitry of the detector of FIG. 2.

As shown in FIG. 4, output signals $P_1(t)$ and $P_2(t)$ from pressure sensors 40 and 48 are first delivered to the signal processing circuitry 52 for signal conditioning by anti-aliasing filters 54. These are typically low pass analog or digital filters that remove higher frequency harmonics in order to present a cleaner signal for analysis. If necessary, the filtered signals are boosted by amplifiers 56 before being delivered to a Fourier analyzer 58 for Fourier transform analysis. The analyzer 58 functions to translate the signals $P_1(t)$ and $P_2(t)$ into corresponding frequency spectrum signals $P_1(f)$ and $P_2(f)$. The signals $P_1(f)$ and $P_2(f)$ represent the coefficients of a discrete Fourier series of the signals $P_1(t)$ and $P_2(t)$ after those signals have been decomposed into frequencies corresponding to the fundamental fan-stator sound source frequency $f_F$, and harmonic modes thereof. The signals $P_1(f)$ and $P_2(f)$ are passed to transfer function determination circuitry 60 for derivation of a complex transfer function in a form $H_{12}$, as follows:

$$H_{12}(f) = \overline{P_2(f)P_1^*(f)} / \overline{P_1(f)P_1^*(f)}$$

wherein $P_1(f)$ is the complex pressure frequency spectrum of the pressure detected at sensor 40, $P_2(f)$ is the complex pressure frequency spectrum of the pressure detected at sensor 48, $P_1^*(f)$ is the complex conjugate of $P_1(f)$, and the overbars indicate time-averaged values.

The value of acoustic impedance due to the orifice 36 is determined in conventional manner from the transfer function, and is correlated with a Mach number M by means of a comparator or other correlation circuitry 62, using known relationships between acoustic impedances and Mach numbers which are previously determined empirically for the particular aircraft fan-stator duct and resonator design employed.

The filters 54, amplifiers 56, Fourier analyzer 58, transfer function determination circuitry 60 and correlation circuitry 62 are all appropriately configured according to conventional techniques from suitably chosen commercially available devices. The functions of the Fourier analyzer 58, the circuitry 60 and the correlator 62 can also be achieved by means of a digital computer using standard, well known programming techniques, and the selection of Mach number M corresponding to the measured impedance can be performed using a look-up table.

If the detector 28 is used at a location or under circumstances where varying boundary layer or other characteristics can affect the measurement accuracy, a calibration circuit 64 (FIG. 4) may be provided to make appropriate adjustments in the transfer function to Mach number correlation performed by the correlation curcuitry 62.

In operation, see FIG. 4, sound waves emanating from a sound source, such as fan blades 16 and stators 17, propagate into an air flow of unknown Mach number M (shown by arrow in FIG. 4) in duct 18 and have components normal to the wall 32 of the duct. The normal component directed at the mouth of orifice 36 of the Helmholtz resonator 34 acts as a sound particle to establish axial mode stationary plane waves in the resonance chamber 38. A transducer 40 detects the resonance cavity bottom pressure $P_1(t)$ as a function of time. A second transducer 48 detects the pressure $P_2(t)$ as a function of time exerted on the wall 32 by the normal component of the propagated sound source wave at a point on wall 32 spaced from the mouth of the orifice 36. The two signals $P_1(t)$ and $P_2(t)$ are analyzed by signal processing circuitry 52 using conventional wave analysis techniques, to determine a value for the acoustic impedance of the resonator 34 which can then be correlated with a Mach number M.

In the circuitry 52, the signals $P_1(t)$ and $P_2(t)$ are passed through filters 54 to remove high order harmonics. They are then amplified, if necessary, by amplifiers 56 and broken down into their constituent frequency components $P_1(f)$ and $P_2(f)$ by standard Fourier transform processes performed by the analyzer 58. A complex transfer function is then determined by circuitry 60 to give a mathematical decomposition of the signal from which the acoustic impedance effect of the resonator on the sound source wave is determined. From the known, previously empirically determined relationship between acoustic impedance and Mach number, or a stored previously determined correlation table, the unknown Mach number $M_o$ of the in-duct flow corresponding to the measured acoustic impedance is determined.

For the configuration of detector shown in FIG. 2, the acoustic impedance $Z(f)$ of the chamber 38 can be expressed as follows:

$$Z(f) = -i \, \text{Cosec}(kL) \times H_{12}(f)$$

wherein $i = \sqrt{-1}$, $k = 29\pi f/c$ the acoustic wave number (with c being the speed of sound in chamber 38), L = the depth of chamber 38, and $H_{12}(f)$ is the transfer function defined above.

When the operating frequency f is such that the depth L of chamber 38 is equal to one-quarter of the wavelength ($\lambda/4$), the acoustic resistance of the resonator 34 may be obtained from the imaginary part of $H_{12}(f)$.

Figure 5A:
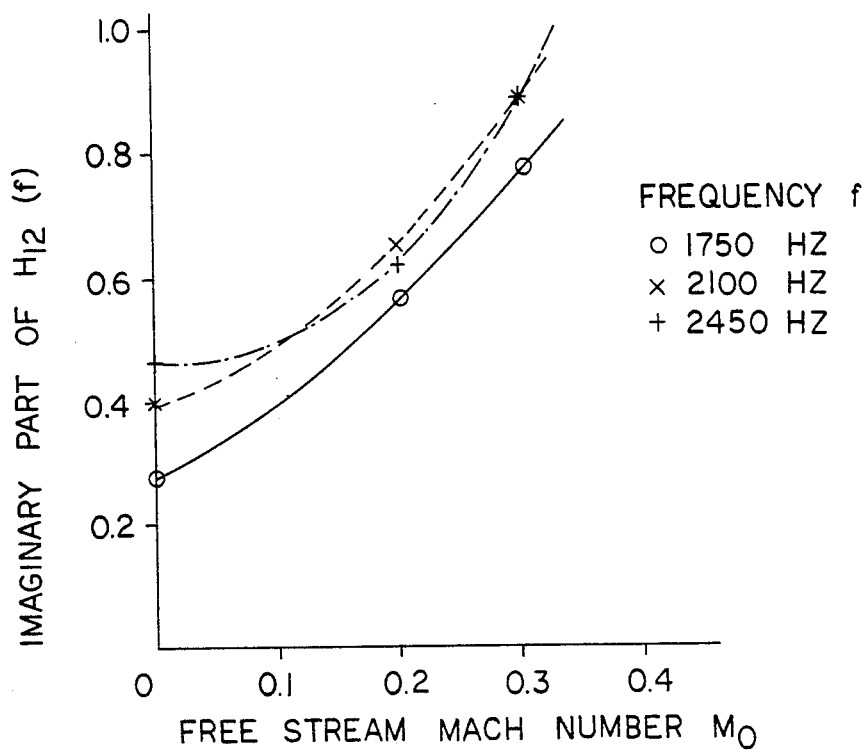
FIGS. 5A-5B and 6A-6B are graphs helpful in understanding the operation of the invention.
Figure 5B:
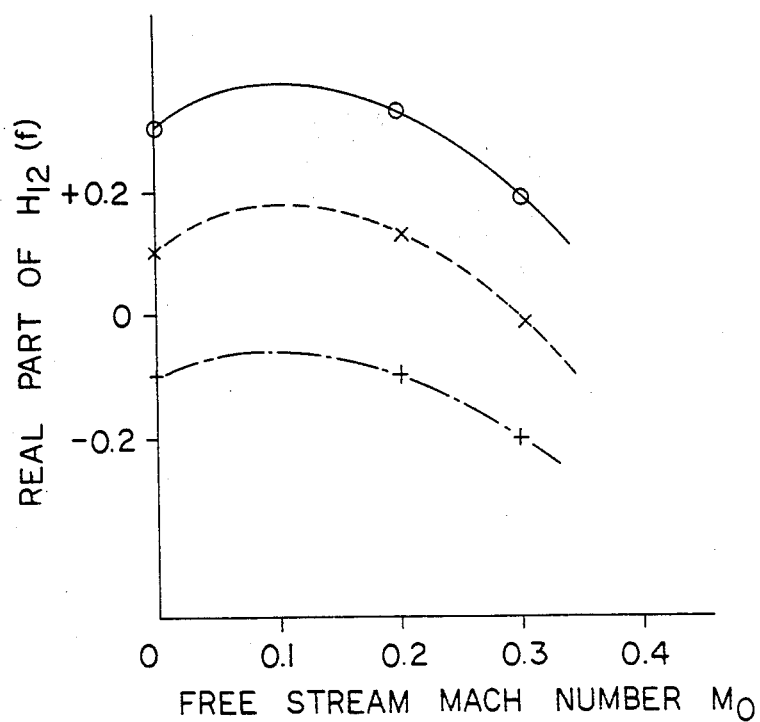
Figure 6A:
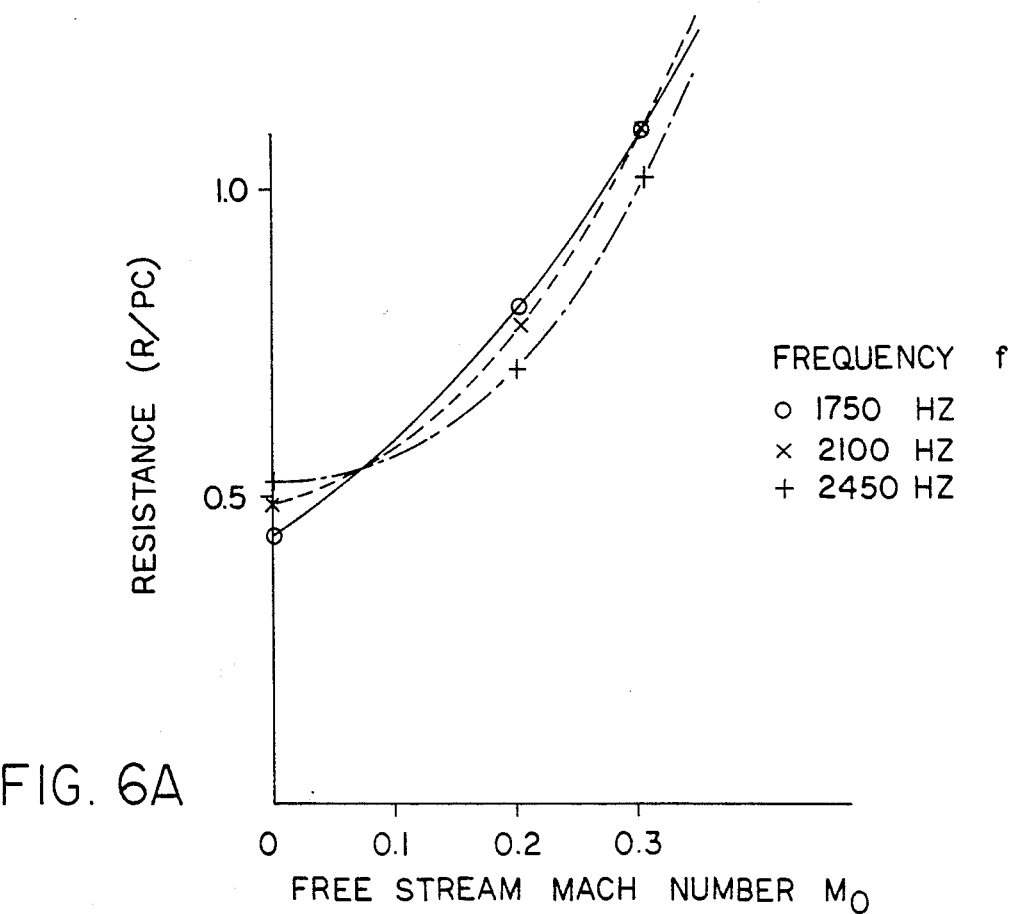
Figure 6B:
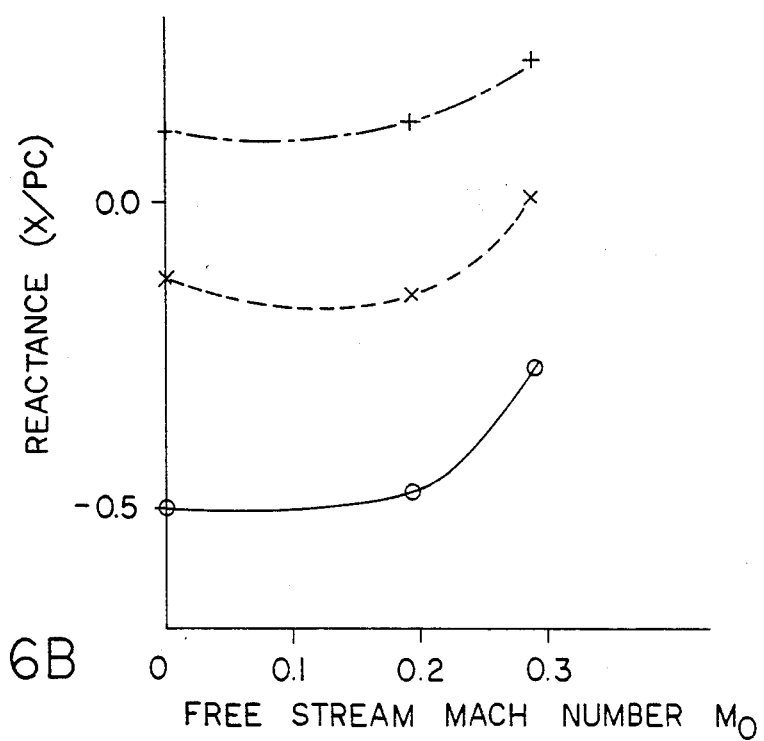

An example of the data of an empirically determined relationship between the acoustic impedance of a Helmholtz resonator system and the Mach number $M_o$ of the flow in the free air stream parallel to a porous face of an aircraft engine duct is given in FIGS. 5A–5B and 6A–6B. The data was obtained for a 1-inch deep resonator cavity and a perforated aluminum facesheet at three frequencies 1750 $H_Z$, 2100 $H_Z$ and 2450 $H_Z$, close to the resonant frequency of the cavity. FIG. 5A shows the variation of the imaginary part of the transfer function $H_{12}(f)$ with the free stream Mach number $M_o$. FIG. 5B shows the variation of the real part of $H_{12}(f)$ with $M_o$. For this example, as can be seen, only the imaginary part of $H_{12}(f)$ is suitable for use as a measure of the Mach number $M_o$. FIGS. 6A and 6B show the variation of the acoustic resistance and reactance values with Mach number.

An example of the data for an empirically determined relationship between the acoustic impedance of a resonator system and the Mach number $M_o$ of the flow in the free stream parallel to the porous face of an aircraft engine duct is shown in FIGS. 5 and 6. This data was obtained in the laboratory with a 1-inch deep cavity and a perforated aluminum facesheet. Data is presented for three frequencies close to the resonance of the cavity. FIG. 5A shows the variation of the imaginary part of $H_{12}(f)$ with the free stream Mach number $M_o$. FIG. 5B shows the variation of the real part with $M_o$. It can be seen that the imaginary part of $H_{12}(f)$ is suitable for use as a measure of the flow Mach number $M_o$. FIGS. 6A and 6B show the variation of the acoustic resistance and reactance values with the flow Mach number $M_o$.

FIG. 1 shows the location of detectors 28 for determination of in-duct airflow Mach number at positions in the intake nozzle 14 and in the bypass duct 18. The Mach number for airflow at either of the indicated positions will generally fall within the range of Mach 0.18–0.60, even for supersonic aircraft flight, and the relationship between acoustic resistance and Mach number will generally be monotonic throughout that range.

A Mach detector 28 in accordance with the invention can also be positioned elsewhere in the aircraft engine to determine local Mach number of in-duct air flows. Placement in hotter operating regions may, however, require special design considerations and the use of expensive high temperature pressure sensors. The detector 28 can be used to determine Mach number of flows of fluid other than air and for flows other than those confined to aircraft engine ducts. An array of resonators 34 or a single resonator 34 may be used for each detector. A thermocouple (not shown) can be installed in the chamber 38, if desired, to measure temperature to compute the local speed of sound.

It will be appreciated that in an actual engine duct environment, the excitation frequency, the sound pressure level and the flow Mach number, all vary with the engine rpm. Also, the boundary layer thickness and profiles vary with the location in the engine duct. For these reasons, a sensor has to be designed for a particular engine application and calibrated for that application. In this way, a sensor can be designed to accurately monitor the flow Mach number in an engine duct during flight operation.

Figure 7:
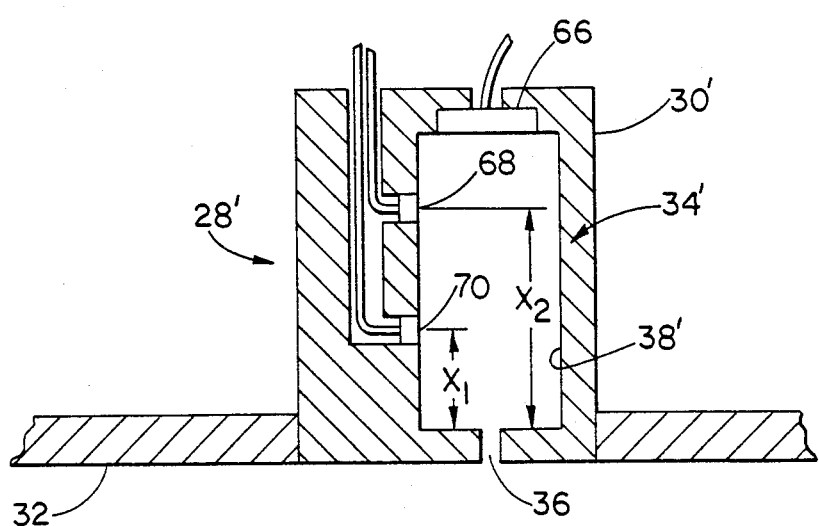
FIG. 7 is a view corresponding to FIG. 2 of a modified form of Mach detector according to the present invention.

FIG. 7 illustrates a modified form of Mach detector 28' that is suited for fluid flow Mach number determination where no appropriate acoustic source is already present. A housing 30' is formed with an acoustic resonator 34' that has an internal acoustic source 66 mounted at the bottom of a resonance chamber 38'. The dimensions of the resonator 34' are chosen for resonance at a characteristic resonance frequency $f_o$ corresponding to the primary frequency mode $f_s$ of the source 66. Acoustic impedance of the orifice 36 is determined from pressures incident on transducers 68 and 70 mounted in spaced positions on the wall of the chamber 38'. The positioning of the transducers 68 and 70 is selected to produce maximum pressure difference between them.

For the configuration illustrated in FIG. 7, the impedance Z(f) of the aperture in terms of the signals measured by transducers at locations $x_1$ and $x_2$ is given by:

$$Z(f) = \frac{-i(\mathrm{Sin}(kx_2) - H_{12}(f')\mathrm{Sin}(kx_1))}{(\mathrm{Cos}(kx_2) - H_{12}(f')\mathrm{Cos}(kx_1))}$$

wherein $i=\sqrt{-1}$, $k=2\pi f/c$ the acoustic wave number $H_{12}(f')=\overline{P_2(f')P_1^*(f')}/\overline{P_1(f')P_1^*(f')}$, is the frequency of excitation of acoustic source 66, and $P_1(f')$ and $P_2(f')$ are the acoustic pressure signals at transducers 70 and 68, respectively.

The foregoing description thus illustrates that the invention provides a method and apparatus for nonintrusively determining Mach number of a flow of fluid in a duct with particular utility for local Mach number determination of airflow in the nozzles and ducts of modern gas turbine aircraft engines. It will be recognized by those skilled in the technology to which the invention relates that various substitutions and modification may be made to the method and apparatus described in the foregoing embodiments, without departing from the spirit and scope of the invention as defined by the claims.

What is claimed is:

1. Apparatus for nonintrusively determining the Mach number of a flow of fluid through a duct, comprising;
   an acoustic resonator positioned behind a wall of said duct and having an opening onto a surface of said wall;
   means for generating an acoustic wave incident on said resonator opening;
   means for determining the acoustic impndance of said resonantor opening; and
   means for correlating said acoustic impedance with Mach number for said flow.

2. Apparatus as in claim 1, wherein said acoustic resonator comprises a Helmholtz resonator having an orifice and a chamber.

3. Apparatus as in claim 2, wherein said acoustic impedance determining means comprises first and second pressure sensors mounted in spaced positions nonintrusively with respect to said duct.

4. Apparatus as in claim 3, wherein said acoustic wave generating means comprises means located within said duct, wherein said first pressure sensor is positioned within said chamber of said Helmholtz resonator; and wherein said second pressure sensor is positioned on said wall surface.

5. Apparatus as in claim 3, wherein said acoustic wave generating means comprises means located within said chamber of said Helmholtz resonator; and wherein said first and second pressure sensors are both positioned within said chamber.

6. Apparatus as in claim 3, wherein said first and second pressure sensors comprise first and second transducers for respectively producing first and second electrical signals $P_1(t)$ and $P_2(t)$ corresponding to the time variation of pressure incident thereon; and wherein said acoustic impedance determining means comprises Fourier analysis means for translating said signals $P_1(t)$ and $P_2(t)$ into corresponding frequency spectrum signals $P_1(f)$ and $P_2(f)$.

7. Apparatus as in claim 6, wherein said acoustic impedance determining means further comprises transfer function determination means for derivation of a transfer function in a form $$H_{12}(f) = \overline{P_2(f)P_1^*(f)}/\overline{P_1(f)\,P_1^*(f)},$$

wherein $P_1^*(f)$ is the complex conjugate of $P_1(f)$ and the overbars indicate time-averaged values.

8. A method for nonintrusively determining the Mach number of a flow of fluid through a duct, comprising the steps of:
   generating an acoustic wave incident on the opening of an acoustic resonator positioned behind a wall of said duct and having an opening onto said wall surface;
   determining the acoustic impedance of said resonator opening; and
   correlating said acoustic impedance with Mach number for said flow.

9. A method as in claim 8, wherein said generating step comprises generating an acoustic wave incident on the opening of a Helmholtz resonator having an orifice and a chamber.

10. A method as in claim 9, wherein said determining step comprises measuring the pressure at first and second spaced positions, nonintrusively with respect to said duct.

11. A method as in claim 10, wherein said generating step further comprises originating said acoustic wave at a location within said duct; and wherein said determining step further comprises measuring the pressure at a first position on said duct wall surface and at a second position within said chamber of said Helmholtz resonator.

12. A method as in claim 10, wherein said generating step comprises originating said acoustic wave at a location within said chamber of said Helmholtz resonator; and wherein said determining step further comprises measuring the pressure at first and second positions within said chamber.

13. A method as in claim 10, wherein said determining step further comprises the steps of producing first and second signals $P_1(t)$ and $P_2(t)$ corresponding to the time variation of said pressure measurements at said first and second positions; and translating said signals $P_1(t)$ and $P_2(t)$ by means of Fourier analysis into corresponding frequency spectrum signals $P_1(f)$ and $P_2(f)$.

14. A method as in claim 13, wherein said determining step further comprises deriving a transfer function in the form $$H_{12}(t) = \overline{P_2(f)P_1^*(f)} / \overline{P_1(f)P_1^*(f)},$$

wherein $P_1^*(f)$ is the complex conjugate of $P_1(f)$ and the overbars indicate time-averaged values.

15. Apparatus for determining the Mach number of a flow of fluid past a wall, comprising:
a Helmholtz acoustic resonator having an orifice and a chamber, and being positioned behind said wall with said orifice opening onto the surface of said wall;
means for generating an acoustic wave incident on said orifice of said Helmholtz resonator;
first and second pressure sensors mounted in spaced positions, nonintrusively with respect to said flow, producing first and second signals $P_1(t)$ and $P_2(t)$ corresponding to the time variation of pressure incident thereon;
means for analyzing said signals $P_1(t)$ and $P_2(t)$ for determining the acoustic impedance of said Helmholtz resonator orifice; and
means for correlating said acoustic impedance with Mach number for said flow.

16. Apparatus as in claim 15, wherein said acoustic wave generating means comprises means for generating an acoustic wave having a characteristic frequency; wherein said Helmholtz resonator is configured to resonate at said characteristic frequency; and
wherein said analyzing means comprises means for analyzing said signals $P_1(t)$ and $P_2(t)$ to determine acoustic impedance of said Helmholtz resonator orifice with respect to said characteristic frequency.

17. A method for determining the Mach number of a flow of fluid past a wall, comprising:
generating an acoustic wave incident on the orifice of a Helmholtz acoustic resonator positioned behind said wall and having an orifice opening onto the surface of said wall;
measuring pressure at first and second spaced positions, nonintrusively with respect to said flow, and producing first and second signals $P_1(t)$ and $P_2(t)$ corresponding to the time variation of said pressure measurements;
analyzing said signals $P_1(t)$ and $P_2(t)$ to determine the acoustic impedance of said Helmholtz resonator orifice; and
correlating said acoustic impedance with Mach number for said flow.

18. A method as in claim 17, wherein said generating step comprises generating an acoustic wave having a characteristic frequency at which said Helmholtz resonator is configured to resonate; and wherein said analysis step comprises the step of analyzing said signals $P_1(t)$ and $P_2(t)$ to determine the acoustic impedance of said Helmholtz resonator orifice with respect to said characteristic frequency.

19. Apparatus for determining the Mach number of gas flow through a duct of a gas turbine engine comprising
a Helmholtz acoustic resonator having a tubular orifice and a cylindrical resonating chamber positioned behind and normal to the surface of a wall of said duct, with the mouth of said orifice flush with said wall surface;
a first pressure sensor mounted within said resonating chamber for producing a first signal $P_1(t)$ corresponding to the time variation of pressure incident thereon;
a second pressure sensor mounted in spaced position relative to said first sensor for producing a second signal $P_2(t)$ corresponding to the time variation of pressure incident thereon;
means for analyzing said signals $P_1(t)$ and $P_2(t)$ for determining the acoustic impedance of said Helmholtz resonator orifice to an acoustic wave incident thereon; and
means for correlating said acoustic impedance with Mach number for said flow.

20. Apparatus as in claim 19, wherein said Helmholtz resonator is configured to resonate at a characteristic frequency of an acoustic wave generated in said duct, and wherein said analyzing means comprises Fourier analysis means for translating the signals $P_1(t)$ and $P_2(t)$ into frequency spectrum signals $P_1(f)$ and $P_2(f)$ and, using said characteristic frequency, determining the acoustic impedance of said Helmholtz resonator orifice by means of a transfer function relationship between $P_1(f)$ and $P_2(f)$.

21. A method for determining the Mach number of gas flow through a duct of a gas turbine engine by means of a Helmholtz acoustic resonator having a tubular orifice and a cylindrical resonating chamber positioned behind and normal to the surface of a wall of said duct, with the mouth of said orifice flush with said wall surface, comprising the steps of:
sensing pressure at a first position within said resonating chamber, and producing a first signal $P_1(t)$ corresponding to the time variation of the sensed pressure;
sensing pressure at a second position spaced from said first position, and producing a second signal $P_2(t)$ corresponding to the time variation of the sensed pressure;
analyzing said signals $P_1(t)$ and $P_2(t)$ to determine the acoustic impedance of said Helmholtz resonator orifice to an acoustic wave incident thereon; and
correlating said acoustic impedance with Mach number for said flow.

22. A method as in claim 21, wherein said Helmholtz resonator is configured to resonate at a characteristic frequency of an acoustic wave generated in said duct, and wherein said analysis step comprises translating said signals $P_1(t)$ and $P_2(t)$ by means of Fourier analysis into frequency spectrum signals $P_1(f)$ and $P_2(f)$, and, using said characteristic frequency, determining the acoustic impedance of said Helmholtz resonator orifice by means of a transfer function relationship between $P_1(f)$ and $P_2(f)$.

* * * * *